(12) United States Patent
Wan et al.

(10) Patent No.: US 10,331,306 B1
(45) Date of Patent: Jun. 25, 2019

(54) SYSTEMS AND METHODS FOR MANAGING COMPUTING OBJECTS WITHIN ENTERPRISE SOFTWARE APPLICATIONS

(71) Applicant: Symantec Corporation, Mountain View, CA (US)

(72) Inventors: Yiyong Wan, White Bear Lake, MN (US); Claudia L. Rudolph, Medina, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 1150 days.

(21) Appl. No.: 14/138,140

(22) Filed: Dec. 23, 2013

(51) Int. Cl.
*G06F 3/0481* (2013.01)
*G06F 3/0482* (2013.01)
*G06F 3/0483* (2013.01)
*G06F 3/038* (2013.01)
*G06F 3/0484* (2013.01)

(52) U.S. Cl.
CPC ................................. *G06F 3/0484* (2013.01)

(58) Field of Classification Search
CPC .... G06F 3/0481; G06F 3/0482; G06F 3/0483; G06F 9/4443; G06F 3/0489; G06F 17/30994
See application file for complete search history.

(56) References Cited

U.S. PATENT DOCUMENTS

| 5,870,088 | A  | * | 2/1999 | Washington | ........ | G06F 3/04847 |
|           |    |   |        |            |          | 715/781 |
| 6,247,020 | B1 | * | 6/2001 | Minard | ..................... | G06F 8/34 |
| 6,486,893 | B1 | * | 11/2002 | Ramchandani | ........... | G06F 8/38 |
|           |    |   |        |            |          | 715/762 |

(Continued)

OTHER PUBLICATIONS

Takeishi, Akira et al., "Modularisation in the auto industry: interlinked multiple hierarchies of product, production and supplier systems", inderscience.metapress.com/content/t3ucfuvly8u78g60/fulltext.pdf?page=1, as accessed Nov. 13, 2013, International Journal of Automotive Technology and Management, vol. 1, No. 4, Inderscience Enterprises Ltd., (2001).

(Continued)

*Primary Examiner* — Kevin L Young
*Assistant Examiner* — Erik V Stitt
(74) *Attorney, Agent, or Firm* — FisherBroyles, LLP

(57) ABSTRACT

A computer-implemented method for managing computing objects within enterprise software applications may include (1) providing, in connection with an enterprise software application, a graphical user interface that includes (i) a graphical tree structure that includes one or more predefined computing objects and (ii) an additional graphical tree structure that includes one or more user-specific object inventories, (2) detecting a user selection of at least one pre-defined computing object included in the graphical user interface in connection with at least one user-specific object inventory included in the additional graphical tree structure, and then (3) populating the user-specific object inventory included in the additional graphical tree structure with the selected pre-defined computing object in response to detecting the user selection. Various other methods, systems, and computer-readable media are also disclosed.

17 Claims, 8 Drawing Sheets

(56) References Cited

U.S. PATENT DOCUMENTS

| | | | | |
|---|---|---|---|---|
| 8,713,056 B1* | 4/2014 | Wongkar | .......... | G06F 17/30327 |
| | | | | 707/783 |
| 2006/0101353 A1* | 5/2006 | Clark | .................... | G06F 3/0481 |
| | | | | 715/792 |
| 2007/0294700 A1* | 12/2007 | Chellam | ............... | G06F 11/327 |
| | | | | 718/104 |
| 2013/0218926 A1* | 8/2013 | Ge | .................... | G06F 17/30961 |
| | | | | 707/796 |

OTHER PUBLICATIONS

IBM Corporation, "Modeling Dimensions with Multiple Hierarchies", http://pic.dhe.ibm.com/infocenter/cbi/v10r1m1/index.jsp?topic=%2Fcom.ibm.swg.ba.cognos.ug_fm.10.1.1.doc%2Fc_bp-dim_multiple_hierarchies.html, as accessed Nov. 13, 2013, (2009, 2012).

* cited by examiner

SYSTEMS AND METHODS FOR MANAGING COMPUTING OBJECTS WITHIN ENTERPRISE SOFTWARE APPLICATIONS

BACKGROUND

Enterprise software applications may enable organizations to manage certain computing objects that help promote and/or advance the objectives of the organizations. Unfortunately, conventional enterprise software applications may have certain shortcomings and/or deficiencies that negatively impact the organizations' experience with such applications. For example, a conventional enterprise software application may be unable to group certain physical and/or virtual computing objects based on lines of business, geographic locations, and/or departments of an organization. Additionally or alternatively, the conventional software application may be unable to provide different levels of access to certain people within the organization who are responsible for managing the physical and/or virtual computing objects.

The instant disclosure, therefore, identifies and addresses a need for improved systems and methods for managing computing objects within enterprise software applications.

SUMMARY

As will be described in greater detail below, the instant disclosure generally relates to systems and methods for managing computing objects within enterprise software applications by providing a graphical user interface that includes multiple graphical tree structures.

In one example, a computer-implemented method for managing computing objects within enterprise software applications may include (1) providing, in connection with an enterprise software application, a graphical user interface that includes (i) a graphical tree structure that includes one or more pre-defined computing objects and (ii) an additional graphical tree structure that includes one or more user-specific object inventories, (2) detecting a user selection of at least one pre-defined computing object included in the graphical user interface in connection with at least one user-specific object inventory included in the additional graphical tree structure, and then (3) populating the user-specific object inventory included in the additional graphical tree structure with the selected pre-defined computing object in response to detecting the user selection.

In one example, the method may also include creating an instance of the selected pre-defined computing object. In this example, the method may further include adding the instance of the selected pre-defined computing object to the user-specific object inventory in the additional graphical tree structure.

In one example, the method may also include identifying a template for at least one configuration setting in connection with the user-specific object inventory. In this example, the method may further include applying the configuration setting to the instance of the selected pre-defined computing object based at least in part on the identified template.

In one example, the method may also include detecting user input that defines the template for the configuration setting in connection with the enterprise software application. In this example, the method may further include creating the template for the configuration setting based at least in part on the detected user input.

In one example, the method may also include vertically aligning the graphical tree structure and the additional graphical tree structure within the graphical user interface. In one embodiment, the graphical tree structure may have at least one object-type group that includes pre-defined computing objects that share a common object type. These pre-defined computing objects may share at least one configuration setting. Additionally or alternatively, the graphical tree structure may have at least one object-subtype group that includes pre-defined computing objects that share a common object subtype within the object-type group.

In one embodiment, the additional graphical tree structure may have at least one user-specific object inventory created by a user of the enterprise software application. Additionally or alternatively, the additional graphical tree structure may have at least one user-specific object sub-inventory created within the user-specific object inventory by a user of the enterprise software application.

In one example, the method may also include detecting a user selection of a user-specific object inventory included in the additional graphical tree structure. In this example, the method may further include modifying the graphical tree structure such that a root node of the graphical tree structure corresponds to the selected user-specific object inventory.

In one embodiment, the user-specific object inventory may include at least one instance of a pre-defined computing object selected from at least one object-type group. In one example, the method may also include displaying the object-type group in connection with the root node that corresponds to the selected user-specific object inventory. In this example, the method may further include displaying the pre-defined computing object selected from the object-type group in connection with the root node that corresponds to the selected user-specific object inventory.

In one embodiment, the graphical user interface may include a graphical listing that corresponds to a node selected in the graphical tree structure. In one example, the method may also include detecting a user selection of a node included in the graphical tree structure. In this example, the method may further include modifying the graphical listing to display at least one of the pre-defined computing objects that corresponds to the selected node.

In one embodiment, the selected node may include a root node of the graphical tree structure that encompasses all of the pre-defined computing objects included in the graphical tree structure. Additionally or alternatively, the selected node may include a root node of the graphical tree structure that corresponds to a user-specific object inventory selected in the additional graphical tree structure. Additionally or alternatively, the selected node may include an object-type group that includes pre-defined computing objects that share a common object type.

In one embodiment, the graphical user interface may include an administrative-side graphical user interface in which the additional graphical tree structure includes all of the user-specific object inventories. Additionally or alternatively, the graphical user interface may include a user-side graphical user interface in which the additional graphical tree structure includes only one or more of the user-specific object inventories that correspond to a specific user of the enterprise software application.

In one example, a system for implementing the above-described method may include (1) a provisioning module that provides, in connection with an enterprise software application, a graphical user interface that includes (i) a graphical tree structure that includes one or more pre-defined computing objects and (ii) an additional graphical tree structure that includes one or more user-specific object inventories, (2) a detection module that detects a user selection of at least one pre-defined computing object included in the graphical user interface in connection with at least one user-specific object inventory included in the additional graphical tree structure, and (3) a population module that populates the user-specific object inventory included in the additional graphical tree structure with the selected pre-defined computing object in response to the detection of the user selection. The system may also include at least one processor that executes the provisioning module, the detection module, and the population module.

In one example, the above-described method may be encoded as computer-readable instructions on a non-transitory computer-readable medium. For example, a computer-readable medium may include one or more computer-executable instructions that, when executed by at least one processor of a computing device, may cause the computing device to (1) provide, in connection with an enterprise software application, a graphical user interface that includes (i) a graphical tree structure that includes one or more pre-defined computing objects and (ii) an additional graphical tree structure that includes one or more user-specific object inventories, (2) detect a user selection of at least one pre-defined computing object included in the graphical user interface in connection with at least one user-specific object inventory included in the additional graphical tree structure, and then (3) populate the user-specific object inventory included in the additional graphical tree structure with the selected pre-defined computing object in response to detecting the user selection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
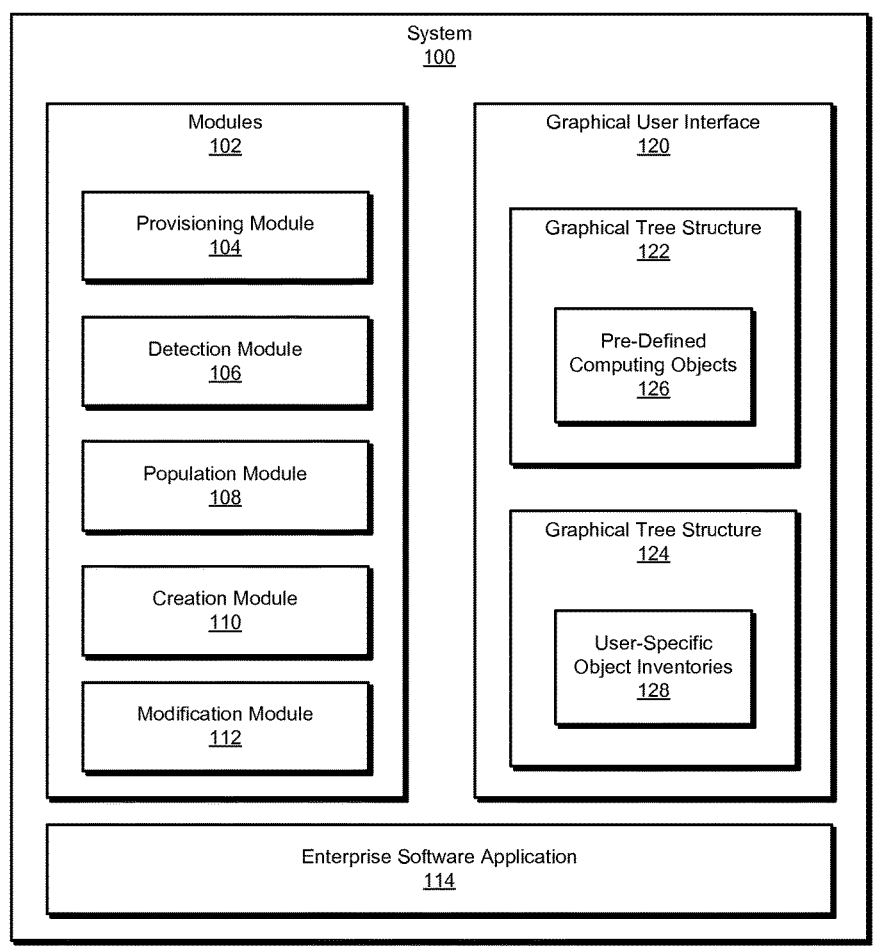
FIG. 1 is a block diagram of an exemplary system for managing computing objects within enterprise software applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing computing objects within enterprise software applications. As will be explained in greater detail below, by providing a graphical user interface that includes a graphical tree structure and an additional graphical tree structure in connection with an enterprise software application, the various systems and methods described herein may facilitate grouping one or more pre-defined computing objects within the graphical tree structure and one or more user-specific object inventories within the additional graphical tree structure. Each object group may include pre-defined computing objects that share at least one common object type. Similarly, each inventory group may correspond to a specific user and/or organization.

Moreover, by facilitating grouping the pre-defined computing objects and the user-specific object inventories in this way, the various systems and methods described herein may enable the organization to manage computing objects within the enterprise software application. For example, these systems and methods may enable the organization to group certain computing objects based at least in part on lines of business, geographic locations, and/or departments of the organization. Additionally or alternatively, these systems and methods may enable the organization to provide different levels of access to certain employees who are responsible for managing the computing objects.

Figure 2:
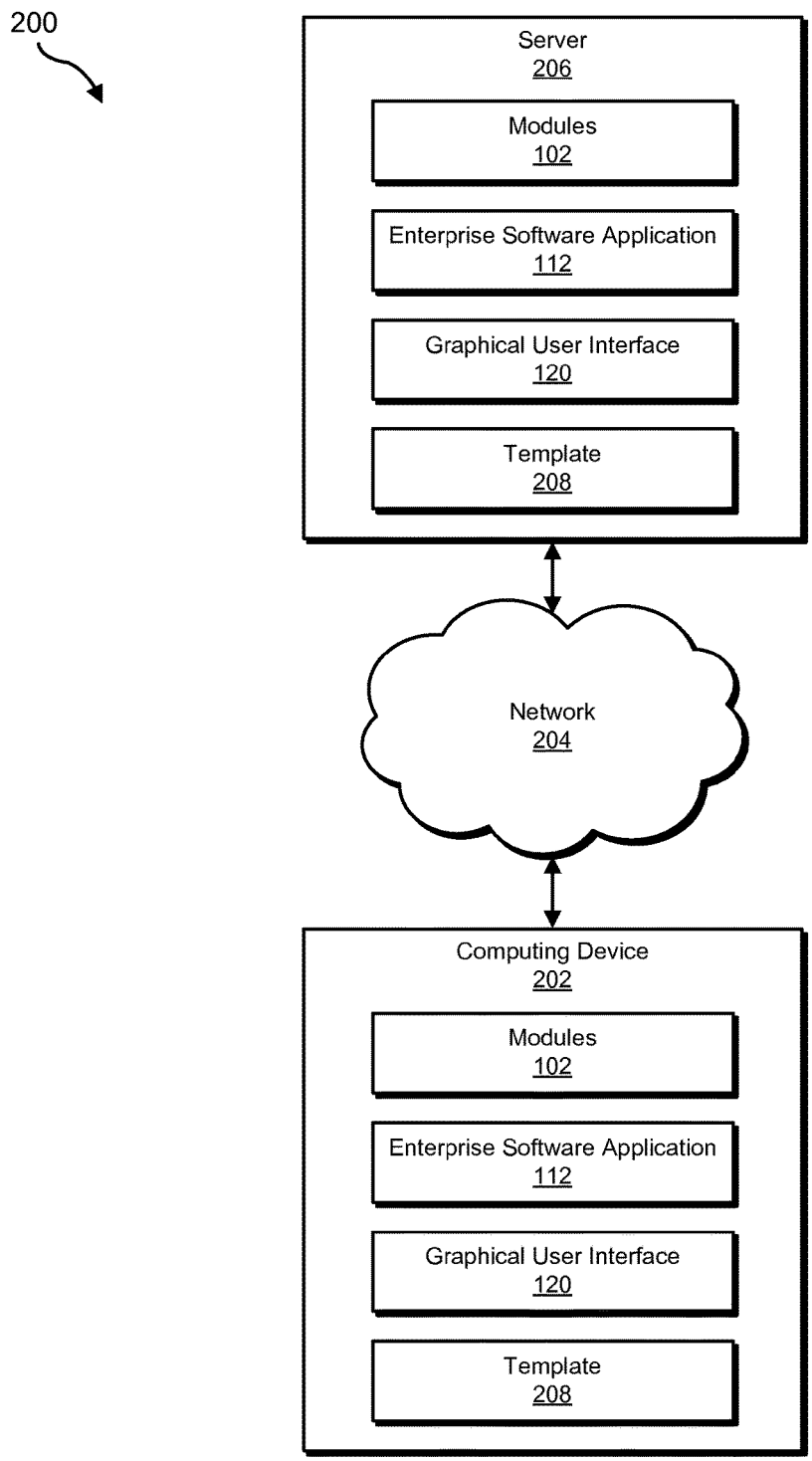
FIG. 2 is a block diagram of an additional exemplary system for managing computing objects within enterprise software applications.
Figure 3:
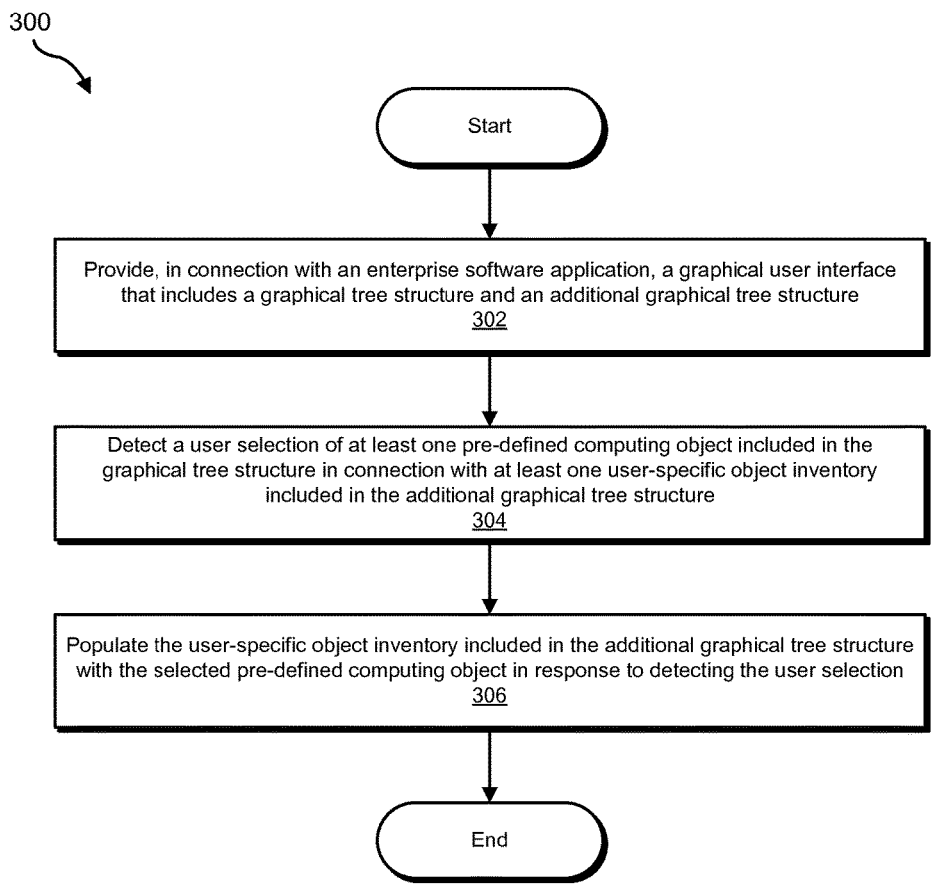
FIG. 3 is a flow diagram of an exemplary method for managing computing objects within enterprise software applications.
Figure 4:
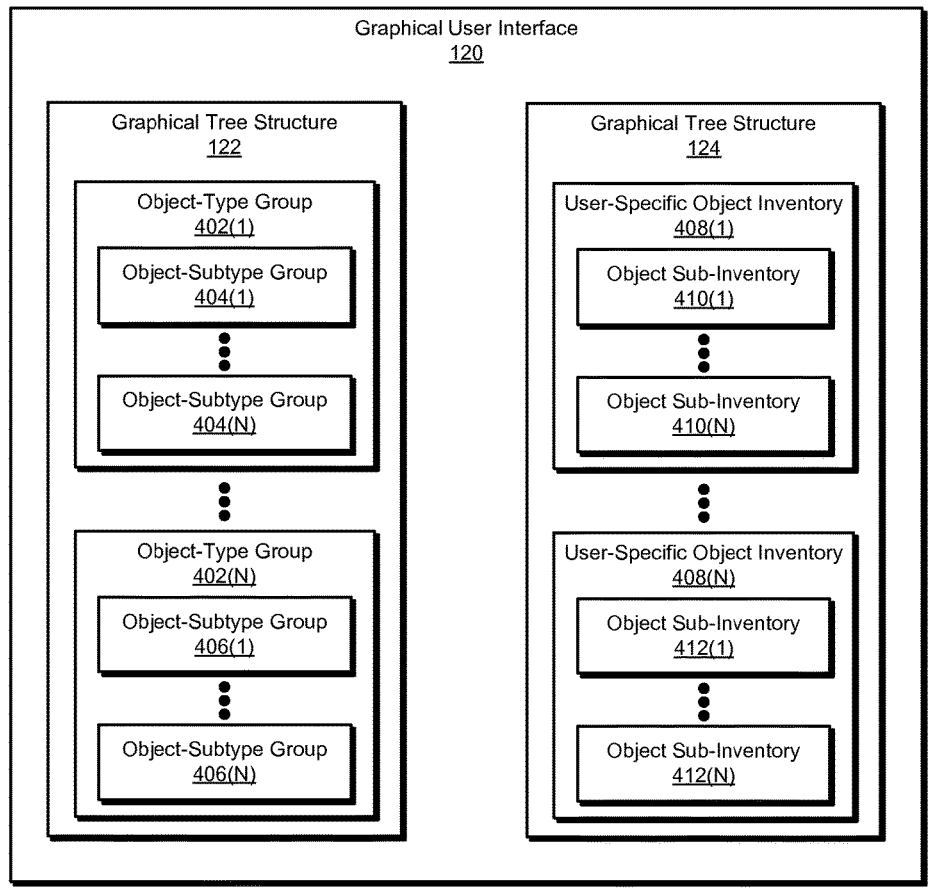
FIG. 4 is a block diagram of an exemplary system for managing computing objects within enterprise software applications.

The following will provide, with reference to FIGS. 1, 2, and 4, detailed descriptions of exemplary systems for managing computing objects within enterprise software applications. Detailed descriptions of corresponding computer-implemented methods will be provided in connection with FIG. 3. Detailed descriptions of exemplary graphical user interfaces will be provided in connection with FIGS. 5 and 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for managing computing objects within enterprise software applications. As illustrated in this figure, exemplary system 100 may include one or more modules 102 for performing one or more tasks. For example, and as will be explained in greater detail below, exemplary system 100 may include a provisioning module 104 that provides a graphical user interface in connection with an enterprise software application. This graphical user interface may include (1) a graphical tree structure that includes one or more pre-defined computing objects and (2) an additional graphical tree structure that includes one or more user-specific object inventories. Exemplary system 100 may also include a detection module 106 that detects a user selection of at least one pre-defined computing object included in the graphical user interface in connection with at least one user-specific object inventory included in the additional graphical tree structure.

In addition, and as will be described in greater detail below, exemplary system 100 may include a population module 108 that populates the user-specific object inventory included in the additional graphical tree structure with the selected pre-defined computing object in response to the detection of the user selection. Exemplary system 100 may further include a creation module 110 that creates a template for at least one configuration setting based at least in part on user input. Exemplary system 100 may additionally include a modification module 112 that modifies one or more portions of the graphical user interface in response to user input. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, EMC CORPORATION'S AVAMAR, ACRONIS TRUE IMAGE, ACRONIS BACKUP & RECOVERY, GENIE BACKUP HOME, INTERNATIONAL BUSINESS MACHINES (IBM) TIVOLI STORAGE MANAGER, or COMMVAULT SIMPANA).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more enterprise software applications, such as enterprise software application 114. The phrase "enterprise software application," as used herein, generally refers to any type or form of software that enables an organization (such as a business, corporation, and/or service provider) to manage computing objects related to the organization. In one embodiment, enterprise software application 114 may enable the organization to group computing objects based at least in part on lines of business, geographic locations, and/or departments of the organization. Additionally or alternatively, enterprise software application 114 may enable the organization to provide different levels of access to certain employees who are responsible for managing the computing objects.

As illustrated in FIG. 1, exemplary system 100 may also include one or more graphical user interfaces, such as graphical user interface 120. The phrase "graphical user interface," as used herein, generally refers to any type or form of graphical representation, view, and/or display that enables a user to interface and/or interact with a computing device. In some embodiments, graphical user interface 120 may represent a portion of enterprise software application 114. For example, graphical user interface 120 may include an administrative-side graphical user interface. Additionally or alternatively, graphical user interface 120 may include a user-side graphical user interface.

As illustrated in FIG. 1, exemplary system 100 may also include one or more graphical tree structures, such as graphical tree structures 122 and 124. The phrase "graphical tree structure," as used herein, generally refers to any type or form of graphical representation, view, and/or display of a data structure. In one embodiment, graphical tree structure 122 may include one or more nodes that represent one or more pre-defined computing objects. Additionally or alternatively, graphical tree structure 124 may include one or more nodes that represent one or more user-specific object inventories.

As illustrated in FIG. 1, exemplary system 100 may also include one or more pre-defined computing objects, such as pre-defined computing objects 126. The phrase "pre-defined computing object," as used herein, generally refers to any type or form of physical and/or virtual computing object provided and/or managed by an enterprise software application. Examples of pre-defined computing objects 126 include, without limitation, clients, servers, storage devices, storage disks, storage tapes, policies, virtual machines, applications, agents, calendars, combinations of one or more of the same, or any other suitable pre-defined computing objects. In one embodiment, pre-defined computing objects 126 may represent heterogeneous computing objects provided and/or made available by enterprise software application 120 as a standard set and/or library.

As illustrated in FIG. 1, exemplary system 100 may also include one or more user-specific object inventories, such as user-specific object inventories 128. The phrase "user-specific object inventory," as used herein, generally refers to any type or form of hierarchical grouping of physical and/or virtual computing objects specific to and/or selected by a user of an enterprise software application. In one embodiment, user-specific object inventories 128 may represent object inventories created by different users of enterprise software application 120.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or include enterprise software application 114, graphical user interface 120, and/or template 208. Additionally or alternatively, server 206 may be programmed with one or more of modules 102 and/or include enterprise software application 114, graphical user interface 120, and/or template 208.

The term "template," as used herein, generally refers to any type or form of rule, policy, and/or instruction that identifies and/or defines configuration settings for computing objects. In one embodiment, template 208 may correspond and/or apply to one or more of pre-defined computing objects 126. Additionally or alternatively, template 208 may correspond and/or apply to one or more of user-specific object inventories 128.

In one embodiment, one or more of modules 102 from FIG. 1 may, when executed by at least one processor of computing device 202 and/or server 206, enable computing device 202 and/or server 206 to manage computing objects within enterprise software applications. For example, and as will be described in greater detail below, one or more of modules 102 may cause computing device 202 and/or server 206 to (1) provide, in connection with enterprise software application 114, graphical user interface 120 that includes (i) graphical tree structure 122 that includes pre-defined computing objects 126 and (ii) graphical tree structure 124 that includes user-specific object inventories 128, (2) detect a user selection of at least one of pre-defined computing objects 126 in connection with at least one of user-specific object inventories 128, and then (3) populate the at least one of user-specific object inventories 128 with the at least one of pre-defined computing objects 126 in response to detecting the user selection.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Server 206 generally represents any type or form of computing device capable of providing at least a portion of an enterprise software application. Examples of server 206 include, without limitation, application servers, web servers, storage servers, security servers, and/or database servers configured to run certain software applications and/or provide various web, storage, security, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for managing computing objects within enterprise software applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may provide a graphical user interface that includes a graphical tree structure and an additional graphical tree structure in connection with an enterprise software application. For example, provisioning module 104 may, as part of computing device 202 and/or server 206 in FIG. 2, provide graphical user interface 120 that includes graphical tree structures 122 and 124 in connection with enterprise software application 114. In this example, graphical tree structure 122 may include one or more nodes that represent one or more of pre-defined computing objects 126. Additionally or alternatively, graphical tree structure 124 may include one or more nodes that represent one or more of user-specific object inventories 128.

The systems described herein may perform step 302 in a variety of ways. In some examples, provisioning module 104 may provide graphical user interface 120 to a user of enterprise software application 114 via a monitor. The term "user," as used herein, generally refers to any type or form of organization (such as a business, corporation, and/or service provider) and/or any person responsible for managing computing objects related to the organization. In one embodiment, the user may include an administrator and/or provider of enterprise software application 114. Additionally or alternatively, the user may include an employee and/or representative of an organization that uses and/or subscribes to enterprise software application 114.

In one example, provisioning module 104 may provide a full version of graphical user interface 120 to an administrator of enterprise software application 114. For example, provisioning module 104 may, as part of server 206, provide an administrative-side graphical user interface for display to the administrator of enterprise software application 114. In this example, the administrative-side graphical user interface may include and/or show all user-specific object inventories 128 that correspond to the organizations that use enterprise software application 114. By providing the administrative-side graphical user interface for display to the administrator, provisioning module 104 may enable the administrator to manage, modify, and/or manipulate any of user-specific object inventories 128 that correspond to the organizations using enterprise software application 114.

In one example, provisioning module 104 may provide a limited version of graphical user interface 120 to an organization that uses enterprise software application 114. For example, provisioning module 104 may, as part of computing device 202, provide a user-side graphical user interface for display to an employee of the organization that uses enterprise software application 114. In this example, the user-side graphical user interface may include and/or show only one or more of user-specific object inventories 128 that correspond to the organization. By providing the user-side graphical user interface for display to the employee, provisioning module 104 may enable the employee to manage, modify, and/or manipulate only those user-specific object inventories 128 that correspond to the organization.

As illustrated in FIG. 4, graphical user interface 120 may include graphical tree structures 122 and 124. Graphical tree structure 122 may include object-type groups 402(1)-(N). The phrase "object-type group," as used herein, generally refers to any type or form of hierarchical grouping of physical and/or virtual computing objects that share a common object type. The phrase "object type," as used herein, generally refers to any type or form of characteristic, attribute, and/or feature that represents and/or defines a type of computing object. Examples of such object types include, without limitation, clients, servers, storage devices, storage disks, storage tapes, policies, virtual machines, applications, agents, calendars, combinations of one or more of the same, or any other suitable object types.

Object-type group 402(1) may include object-subtype groups 404(1)-(N). Similarly, object-type group 402(N) may include object-subtype group 406(1)-(N). The phrase "object-subtype group," as used herein, generally refers to any type or form of hierarchical grouping of pre-defined computing objects that share a common object subtype within a specific object-type group. In one embodiment, the pre-defined computing objects included in object-type group 406(1) may share one or more configuration settings. Examples of such configuration settings include, without limitation, access-control settings, permissions settings, read/write settings, sharing settings, grouping settings, inheritance settings, combinations of one or more of the same, or any other suitable configuration settings.

The phrase "object subtype," as used herein, generally refers to any type or form of characteristic, attribute, and/or feature that represents and/or defines a subtype within an object type. In other words, an object subtype may categorize one or more pre-defined computing objects with a greater degree of specificity and/or precision than an object type.

Additionally or alternatively, graphical tree structure 124 may include user-specific object inventories 408(1)-(N) created by the user of enterprise software application 114. As illustrated in FIG. 4, user-specific object inventory 408(1) may include user-specific object sub-inventories 410(1)-(N) created by the user of enterprise software application 114. Similarly, user-specific object inventory 408(N) may include user-specific object sub-inventories 412(1)-(N) created by the user of enterprise software application 114. The phrase "user-specific object sub-inventory," as used herein, generally refers to any type or form of hierarchical grouping of physical and/or virtual computing objects created and/or selected by a user of an enterprise software application within a user-specific object inventory. Accordingly, a user-specific object sub-inventory may categorize one or more computing objects with a greater degree of specificity and/or precision than a user-specific object inventory.

In one example, provisioning module 104 may vertically align graphical tree structures 122 and 124 within graphical user interface 120. For example, provisioning module 104 may provide and/or show graphical tree structure 124 above graphical tree structure 122 within graphical user interface 120. By providing and/or showing graphical tree structure 124 above graphical tree structure 122, provisioning module 104 may vertically align graphical tree structures 122 and 124 within graphical user interface 120.

Returning to FIG. 3, at step 304 one or more of the systems described herein may detect a user selection of at least one pre-defined computing object included in the graphical user interface in connection with at least one user-specific object inventory included in the additional graphical tree structure. For example, detection module 106 may, as part of computing device 202 and/or server 206 in FIG. 2, detect a user selection of at least one of pre-defined computing objects 126 in connection with at least one of user-specific object inventories 128. In this example, the user may select the pre-defined computing object from one of object-type groups 402(1)-(N) in FIG. 4. Additionally or alternatively, the user may select the pre-defined computing object from one of object-subtype groups 404(1)-(N) or object-subtype groups 406(1)-(N) in FIG. 4.

As will be describe in greater detail below, the user may perform this selection of the pre-defined computing object in connection with one of user-specific object inventories 408(1)-(N) in FIG. 4. Additionally or alternatively, the user may perform this selection of the pre-defined computing object in connection with one of user-specific object sub-inventories 410(1)-(N) or 412(1)-(N) in FIG. 4.

The systems described herein may perform step 304 in a variety of ways. In some examples, detection module 106 may detect the user selection of the pre-defined computing object based at least in part on user input. For example, detection module 106 may monitor graphical tree structure 122 included in graphical user interface 120. While monitoring graphical tree structure 122, detection module 106 may determine that the user is attempting to select a pre-defined computing object included in graphical tree structure 122.

Additionally or alternatively, detection module 106 may monitor a graphical listing (such as graphical listing 502 in FIG. 5) that corresponds to one or more nodes selected in graphical tree structures 122 and 124. While monitoring the graphical listing, detection module 106 may determine that the user is attempting to select a pre-defined computing object included in the graphical listing.

Similarly, detection module 106 may determine that the user selection of the pre-defined computing object corresponds to the user-specific object inventory based at least in part on user input. For example, detection module 106 may monitor graphical tree structure 124 included in graphical user interface 120. While monitoring graphical tree structure 124, detection module 106 may determine that the user is attempting to select a user-specific object inventory included in graphical tree structure 124.

In some examples, detection module 106 may detect the user selection of the pre-defined computing object in connection with user-specific object inventory based at least in part on a drag-and-drop operation. For example, detection module 106 may determine that the user is attempting to drag the selected pre-defined computing object and drop the same into the user-specific object inventory. In one embodiment, the user may drag the selected pre-defined computing object from graphical tree structure 122. Additionally or alternatively, the user may drag the selected pre-defined computing object from the graphical listing that corresponds to one or more nodes selected in graphical tree structures 122 and 124.

Returning to FIG. 3, at step 306 one or more of the systems described herein may populate the user-specific object inventory included in the additional graphical tree structure with the selected pre-defined computing object in response to detecting the user selection. For example, population module 108 may, as part of computing device 202 and/or server 206 in FIG. 2, populate the user-specific object inventory included in graphical tree structure 124 with the pre-defined computing object selected pre-defined computing object. In this example, population module 108 may initiate this process of populating the user-specific object inventory in response to the detection of the user selection.

The systems described herein may perform step 306 in a variety of ways. In some examples, population module 108 may add an instance of the selected predefined computing object to the user-specific object inventory. For example, creation module 110 may create an instance of the selected pre-defined computing object. Creation module 110 may create the instance by copying the selected pre-defined computing object. Once creation module 110 has created the instance of the selected pre-defined computing object, population module 108 may add this instance to the user-specific object inventory in graphical tree structure 124.

In one embodiment, the instance of the selected pre-defined computing object may inherit one or more configuration settings from the corresponding object-type group and/or object-subtype group. Additionally or alternatively, the instance of the selected pre-defined computing object may inherit one or more configuration settings from the corresponding user-specific object inventory. Examples of such configuration settings include, without limitation, access-control settings, permissions settings, read/write settings, sharing settings, grouping settings, inheritance settings, combinations of one or more of the same, or any other suitable configuration settings.

In one example, enterprise software application 114 may enable the selected pre-defined computing object to inherit the configuration settings based at least in part on template 208 in FIG. 2. For example, population module 108 may identify one or more configuration settings defined in template 208 in FIG. 2. In this example, population module 108 may apply the configuration settings defined in template 208 to the instance of the selected pre-defined computing object during the population process.

In one example, creation module 110 may create template 208 based at least in part on user input. For example, detection module 106 may detect user input that defines one or more configuration settings. Creation module 110 may then create template 208 based at least in part on the detected user input. Once creation module 110 has created template 208, population module 108 may apply the configuration settings defined in template 208 to each instance of the selected pre-defined computing object during the population process.

In some examples, enterprise software application 114 may enable the user to override one or more of the inherited configuration settings. For example, detection module 106 may detect user input that specifies one or more configuration settings that differ from template 208. In response to this detection of the user input, detection module 106 may override template 208 by applying the configuration settings specified in the user input.

In one example, enterprise software application 114 may apply a single-membership feature to pre-defined computing objects 126. The phrase "single-membership feature," as used herein, generally refers to any type or form of rule, policy, and/or instruction that prevents a specific instance of a computing object from belonging to multiple object-type groups and/or multiple object-subtype groups at the same time. By applying this single-membership feature to pre-defined computing objects 126, enterprise software application 114 may ensure that the instances of pre-defined computing objects 126 inherit the correct configuration settings during the population process.

Figure 5:
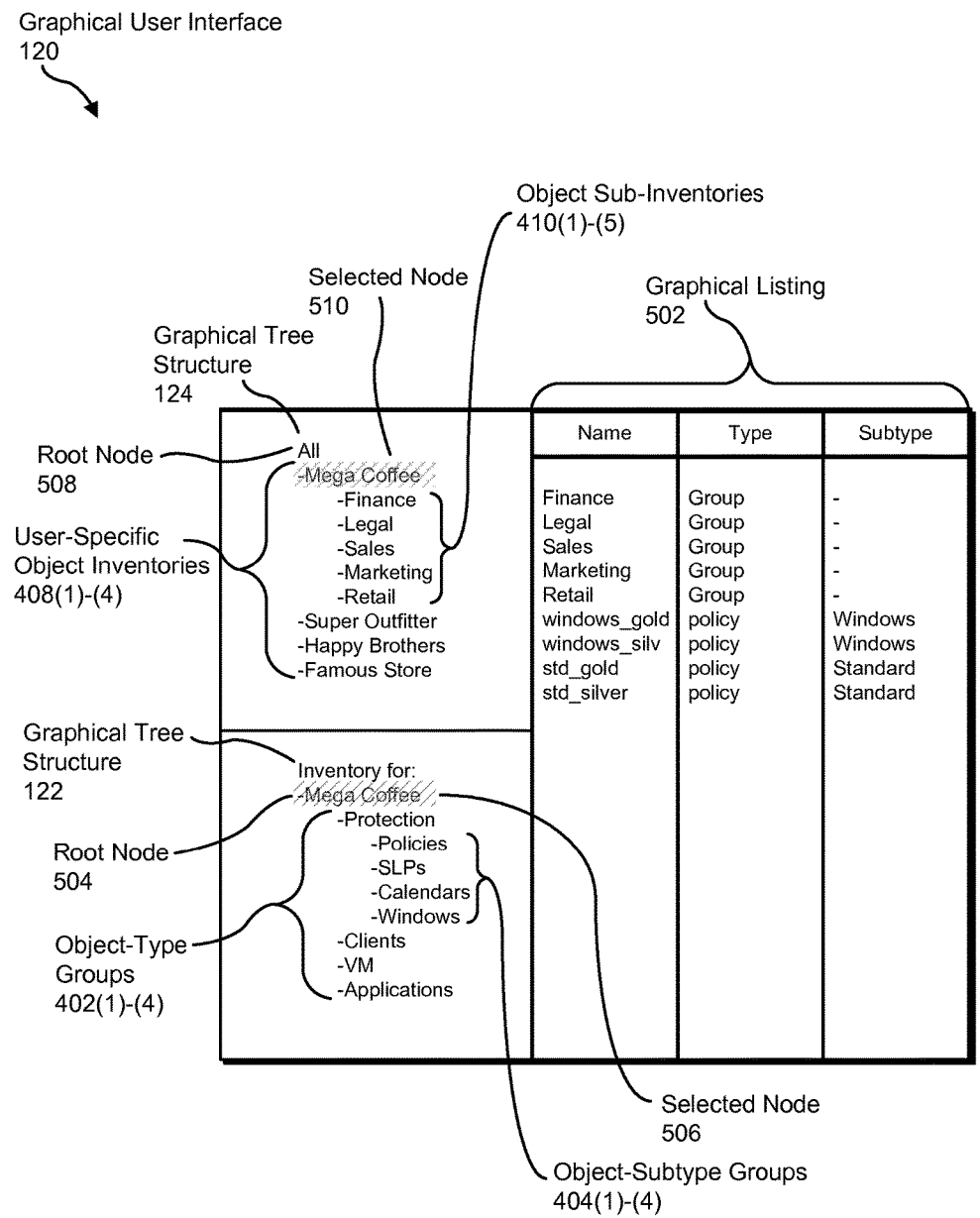
FIG. 5 is an illustration of an exemplary graphical user interface for managing computing objects within enterprise software applications.

As illustrated in FIG. 5, graphical user interface 120 may include graphical tree structure 122 with a root node 504 (in this example, "Mega Coffee"), selected node 506 (in this example, "Mega Coffee"), object-type groups 402(1)-(4) (in this example, "Protection," "Clients," "VM," and "Applications," respectively), object-subtype groups 404(1)-(4) (in this example, "Policies," "SLPs," "Calendars," and "Windows," respectively), graphical tree structure 124 with a root node 508 (in this example, "All"), selected node 510 (in this example, "Mega Coffee"), user-specific object inventories 408(1)-(4) (in this example, "Mega Coffee," "Super Outfitter," "Happy Brothers," and "Famous Store," respectively), user-specific object sub-inventories 410(1)-(5) (in this example, "Finance," "Legal," "Sales," "Marketing," and "Retail," respectively), and graphical listing 502 that enumerates various computing objects (in this example, "Finance," "Legal," "Sales," "Marketing," "Retail," "windows_gold," "windows_silv," "std_gold," and "std_silver") of a specific object type (in this example, "Group" and "policy") and a specific object subtype (in this example, "-" or not applicable, "Windows," and "Standard").

The phrase "selected node," as used herein, generally refers to any type or form of node selected by a user in a graphical tree structure. Examples of such selected nodes include, without limitation, a root node that encompasses all of pre-defined computing objects 126, a root node that encompasses all of user-specific object inventories 128, a user-specific object inventory, a user-specific object sub-inventory, an object-type group, an object-subtype group, combinations of one or more of the same, or any other suitable nodes selected by a user in a graphical tree structure.

In one embodiment, root node 504 of graphical tree structure 122 may reflect selected node 510 of graphical tree structure 124. For example, detection module 106 may detect a user selection of the "Mega Coffee" object inventory included in graphical tree structure 124. In response to this detection of the user selection, modification module 112 may modify graphical tree structure 122 such that root node 504 corresponds to the "Mega Coffee" object inventory selected in graphical tree structure 124.

In one embodiment, the "Mega Coffee" object inventory may include one or more of pre-defined computing objects 126 selected from each of object-type groups 402(1)-(4). As a result, modification module 112 may modify graphical tree structure 122 to display each of object-type groups 402(1)-(4) in connection with the selected "Mega Coffee" object inventory. In contrast, modification module 112 may prevent graphical tree structure 122 from displaying any object-type groups that do not correspond to the selected "Mega Coffee" object inventory. In other words, modification module 112 may modify graphical tree structure 122 to display only those object-type groups that include pre-defined computing objects selected for populating the "Mega Coffee" object inventory.

Similarly, the "Mega Coffee" object inventory may include one or more of pre-defined computing objects 126 selected from each of object-subtype groups 404(1)-(4). As a result, modification module 112 may modify graphical tree structure 122 to display each of object-subtype groups 404(1)-(4) in connection with the selected "Mega Coffee" object inventory. In contrast, modification module 112 may prevent graphical tree structure 122 from displaying any object-subtype groups that do not correspond to the selected "Mega Coffee" object inventory. In other words, modification module 112 may modify graphical tree structure 122 to display only those object-subtype groups that include pre-defined computing objects selected for populating the "Mega Coffee" object inventory.

In some examples, modification module 112 may modify portions of graphical user interface 120 in FIG. 5 based at least in part on user input. For example, detection module 106 may detect a user selection of the "Finance" object sub-inventory within the "Mega Coffee" object inventory. In response to this detection of the user selection, modification module 112 may modify graphical tree structure 122 such that root node 504 corresponds to the "Finance" object sub-inventory selected in graphical tree structure 124.

In one example, detection module 106 may detect a user selection of the "Clients" object-type group included in graphical tree structure 122. In response to this detection of the user selection, modification module 112 may modify graphical tree structure 122 to expose object-subtype groups 406(1)-(4) (not illustrated in FIG. 5) within the "Clients" object-type group. Additionally or alternatively, modification module 112 may modify graphical listing 502 to correspond to the selected "Clients" object-type group. Upon completion of these modifications to graphical user interface 120, modification module 112 may have transformed graphical user interface 120 into the version illustrated in FIG. 6.

Figure 6:
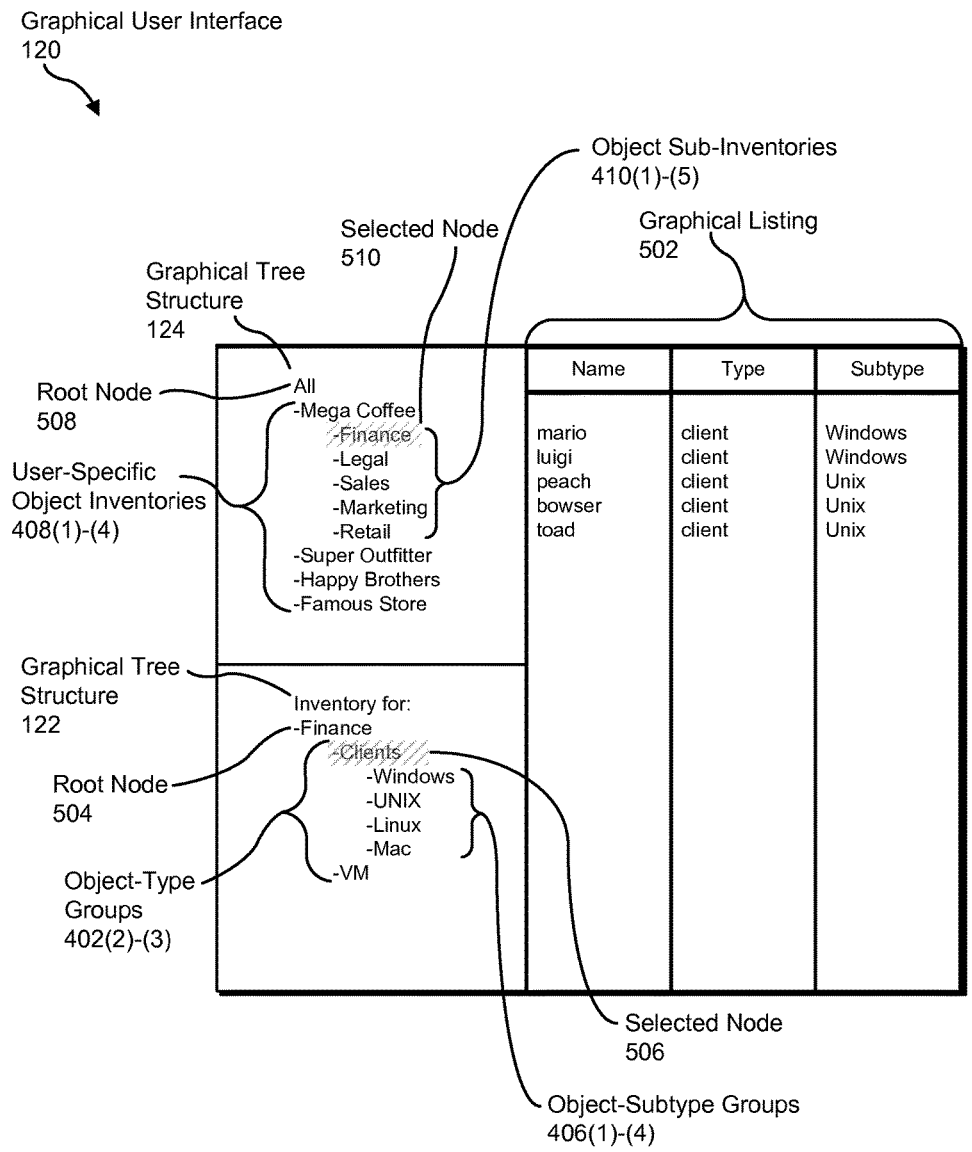
FIG. 6 is an illustration of an exemplary graphical user interface for managing computing objects within enterprise software applications.

As illustrated in FIG. 6, graphical user interface 120 may include graphical tree structure 122 with a root node 504 (in this example, "Finance"), selected node 506 (in this example, "Clients"), object-type groups 402(2)-(3) (in this example, "Clients" and "VM," respectively), object-subtype groups 406(1)-(4) (in this example, "Windows," "UNIX," "Linux," and "Mac," respectively), graphical tree structure 124 with a root node 508 (in this example, "All"), selected node 510 (in this example, "Finance"), user-specific object inventories 408(1)-(4) (in this example, "Mega Coffee," "Super Outfitter," "Happy Brothers," and "Famous Store," respectively), user-specific object sub-inventories 410(1)-(5) (in this example, "Finance," "Legal," "Sales," "Marketing," and "Retail," respectively), and graphical listing 502 that enumerates various computing objects (in this example, "mario," "luigi," "peach," "bowser," and "toad") of a specific object type (in this example, "client") and a specific object subtype (in this example, "Windows" and "Unix").

As explained above in connection with method 300 in FIG. 3, an enterprise software application may provide a graphical user interface having multiple graphical tree structures vertically aligned with one another. In this graphical user interface, the top graphical tree structure may include multiple user-created object inventories. A user may select one of these user-created object inventories included in the top graphical tree structure.

In contrast, the bottom graphical tree structure may include a root node that corresponds to the user-created object inventory selected in the top graphical tree structure. The bottom graphical tree structure may also include one or more hierarchical nodes that represent different computing objects grouped together based at least in part on an object type and/or an object subtype. By providing this graphical user interface, the enterprise software application may facilitate grouping certain computing objects based at least in part on lines of business, geographic locations, and/or departments of an organization. Additionally or alternatively, the enterprise software application may provide different levels of access to certain employees of an organization who are responsible for managing the computing objects.

Figure 7:
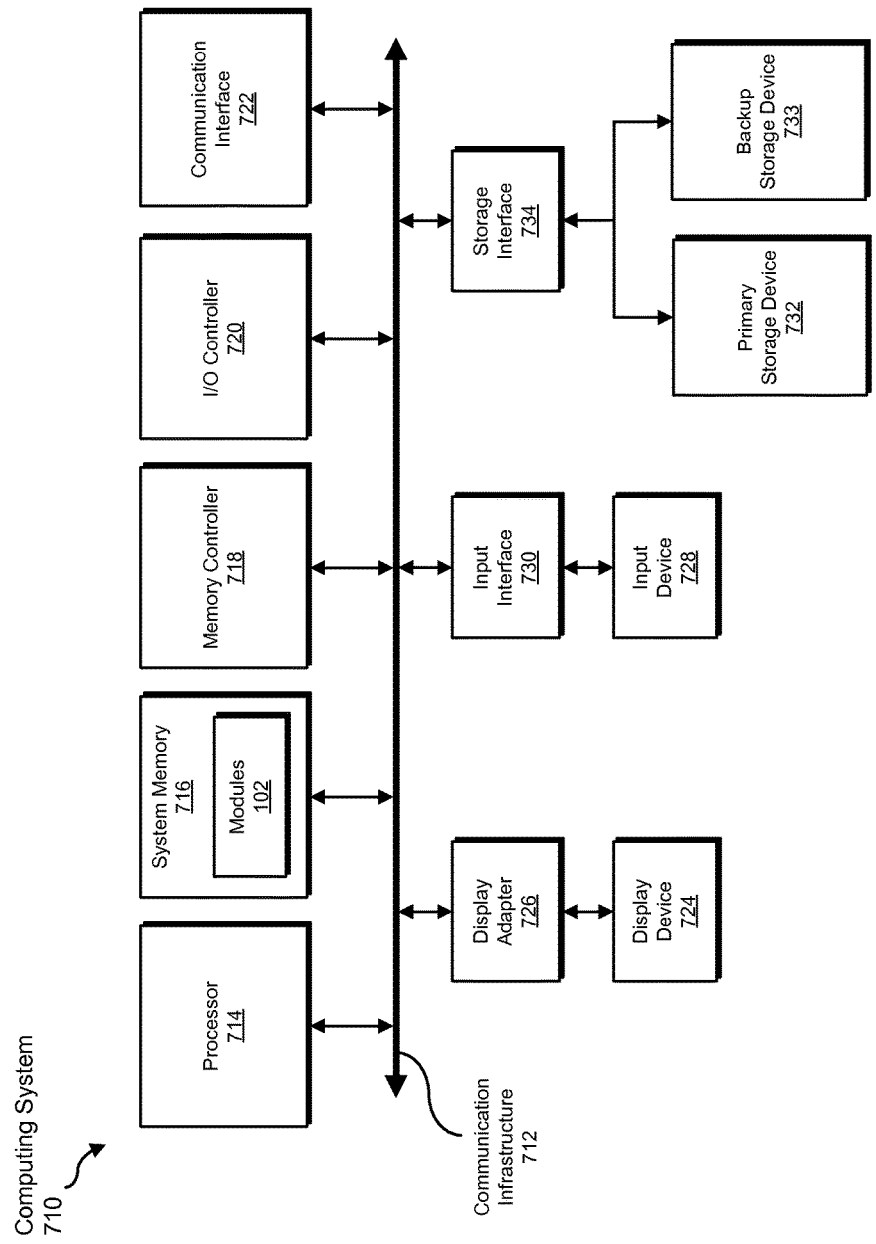
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
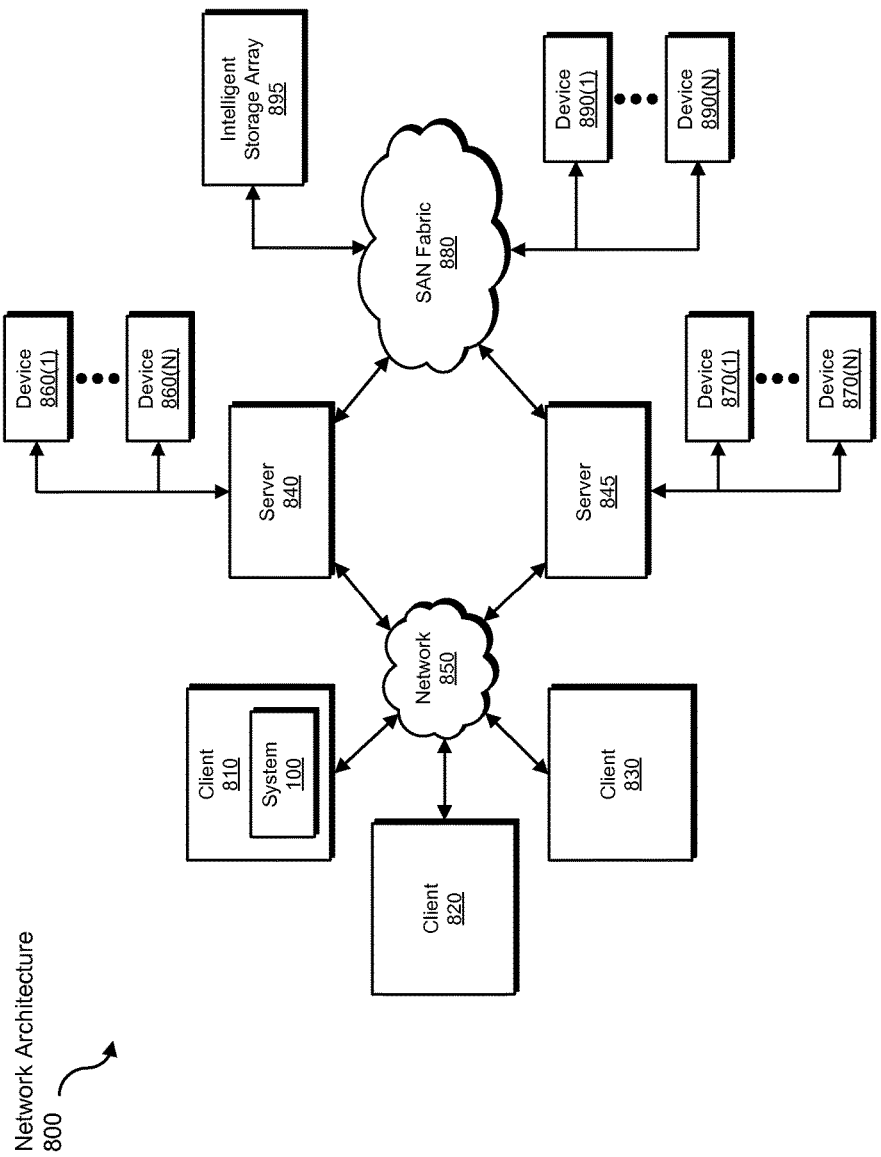
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for managing computing objects within enterprise software applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive user input to be transformed, transform the user input, output a result of the transformation to modify a graphical user interface, use the result of the transformation to display for a user of the graphical user interface, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing computing objects within enterprise software applications, at least a portion of the method being performed by a computing device comprising at least one processor, the method comprising:
    providing, in connection with an enterprise software application, a graphical user interface that comprises:
        a graphical tree structure that includes one or more pre-defined computing objects;
        an additional graphical tree structure that includes one or more user-specific object inventories;
        a graphical listing that corresponds to a node selected in the graphical tree structure;
    wherein the graphical user interface further comprises at least one of:
        an administrative-side graphical user interface in which the additional graphical tree structure includes all of the user-specific object inventories;
        a user-side graphical user interface in which the additional graphical tree structure includes only one or more of the user-specific object inventories that correspond to a specific user of the enterprise software application;
    detecting a user selection of at least one pre-defined computing object included in the graphical user interface in connection with at least one user-specific object inventory included in the additional graphical tree structure, wherein:
        the user-specific object inventory includes at least one instance of a pre-defined computing object selected from an object-type group;
    applying, to the selected pre-defined computing object, a single-membership feature that prevents the selected pre-defined computing object from belonging to multiple object-type groups simultaneously;
    in response to the user selection of the pre-defined computing object, populating the user-specific object inventory included in the additional graphical tree structure with the selected pre-defined computing object such that the selected pre-defined computing object inherits one or more configuration settings from the object-type group during the population of the user-specific object inventory;
    detecting a user selection of a user-specific object inventory included in the additional graphical tree structure;
    in response to the user selection of the user-specific object inventory, modifying the graphical tree structure such that:
        a root node of the graphical tree structure corresponds to the selected user-specific object inventory;
        the object-type group is displayed in connection with the root node that corresponds to the selected user-specific object inventory;
    detecting a user selection of the root node of the graphical tree structure that corresponds to the selected user-specific object inventory;
    in response to the user selection of the root node of the graphical tree structure, modifying the graphical listing to display at least the pre-defined computing object included in the selected user-specific object inventory.

2. The method of claim 1, wherein populating the user-specific object inventory included in the additional graphical tree structure with the selected pre-defined computing object comprises:
   creating the instance of the selected pre-defined computing object;
   adding the instance of the selected pre-defined computing object to the user-specific object inventory in the additional graphical tree structure.

3. The method of claim 2, wherein adding the instance of the selected pre-defined computing object to the user-specific object inventory in the additional tree structure comprises:
   identifying a template for at least one configuration setting in connection with the user-specific object inventory;
   applying the configuration setting to the instance of the selected pre-defined computing object based at least in part on the identified template.

4. The method of claim 3, further comprising:
   detecting, in connection with the enterprise software application, user input that defines the template for the configuration setting;
   creating the template for the configuration setting based at least in part on the detected user input.

5. The method of claim 1, wherein providing the graphical user interface comprises vertically aligning the graphical tree structure and the additional graphical tree structure within the graphical user interface.

6. The method of claim 1, wherein:
   the object-type group includes pre-defined computing objects that share a common object type;
   the graphical tree structure comprises at least one object-subtype group that includes pre-defined computing objects that share a common object subtype within the object-type group.

7. The method of claim 6, wherein the pre-defined computing objects included in the object-type group share at least one configuration setting.

8. The method of claim 1, wherein the additional graphical tree structure comprises at least one of:
   at least one user-specific object inventory created by a user of the enterprise software application;
   at least one user-specific object sub-inventory created within the user-specific object inventory by a user of the enterprise software application.

9. The method of claim 1, wherein modifying the graphical tree structure comprises displaying the pre-defined computing object selected from the object-type group in connection with the root node that corresponds to the selected user-specific object inventory.

10. The method of claim 1, further comprising:
   detecting a user selection of another node of the graphical tree structure;
   in response to the user selection of the other node of the graphical tree structure, modifying the graphical listing to display at least one of the pre-defined computing objects that corresponds to the selected node;
   wherein the selected node comprises at least one of:
      a root node of the graphical tree structure that encompasses all of the pre-defined computing objects included in the graphical tree structure;
      an object-type group that includes pre-defined computing objects that share a common object type.

11. The method of claim 1, wherein the configuration settings inherited by the pre-defined computing object comprises at least one of:
   one or more access-control settings;
   one or more permission settings;
   one or more read/write settings;
   one or more sharing settings;
   one or more grouping settings;
   one or more inheritance settings.

12. A system for managing computing objects within enterprise software applications, the system comprising:
   a provisioning module, stored in memory, that provides, in connection with an enterprise software application, a graphical user interface that comprises:
      a graphical tree structure that includes one or more pre-defined computing objects;
      an additional graphical tree structure that includes one or more user-specific object inventories;
      a graphical listing that corresponds to a node selected in the graphical tree structure;
   wherein the graphical user interface further comprises at least one of:
      an administrative-side graphical user interface in which the additional graphical tree structure includes all of the user-specific object inventories;
      a user-side graphical user interface in which the additional graphical tree structure includes only one or more of the user-specific object inventories that correspond to a specific user of the enterprise software application;
   a detection module, stored in memory, that detects a user selection of at least one pre-defined computing object included in the graphical user interface in connection with at least one user-specific object inventory included in the additional graphical tree structure, wherein the user-specific object inventory includes at least one instance of a pre-defined computing object selected from an object-type group;
   a population module, stored in memory, that populates, in response to the user selection of the pre-defined computing object, the user-specific object inventory included in the additional graphical tree structure with the selected pre-defined computing object such that the selected pre-defined computing object inherits one or more configuration settings from the object-type group during the population of the user-specific object inventory;
   wherein the detection module detects a user selection of a user-specific object inventory included in the additional graphical tree structure;
   a modification module, stored in memory, that:
      applies, to the selected pre-defined computing object, a single-membership feature that prevents the selected pre-defined computing object from belonging to multiple object-type groups simultaneously;
      modifies the graphical tree structure in response to the user selection of the user-specific object inventory such that:
         a root node of the graphical tree structure corresponds to the selected user-specific object inventory;
         the object-type group is displayed in connection with the root node that corresponds to the selected user-specific object inventory;
   wherein:
      the detection module detects a user selection of the root node of the graphical tree structure that corresponds to the selected user-specific object inventory;
      the modification module modifies, in response to the user selection of the root node of the graphical tree structure, the graphical listing to display at least the pre-defined computing object included in the selected user-specific object inventory;

at least one physical processor that executes the provisioning module, the detection module, the population module, and the modification module.

13. The system of claim 12, wherein the population module populates the user-specific object inventory by:
creating the instance of the selected pre-defined computing object;
adding the instance of the selected pre-defined computing object to the user-specific object inventory in the additional graphical tree structure.

14. The system of claim 13, wherein the population module adds the instance of the selected pre-defined computing object by:
identifying a template for at least one configuration setting in connection with the user-specific object inventory;
applying the configuration setting to the instance of the selected pre-defined computing object based at least in part on the identified template.

15. The system of claim 14, wherein:
the detection module detects, in connection with the enterprise software application, user input that defines the template for the configuration setting;
further comprising a creation module that creates the template for the configuration setting based at least in part on the detected user input.

16. The system of claim 12, wherein the provisioning module provides the graphical user interface by vertically aligning the graphical tree structure and the additional graphical tree structure within the graphical user interface.

17. A non-transitory computer-readable medium comprising one or more computer-executable instructions that, when executed by at least one processor of a computing device, cause the computing device to:
provide, in connection with an enterprise software application, a graphical user interface that comprises:
a graphical tree structure that includes one or more pre-defined computing objects;
an additional graphical tree structure that includes one or more user-specific object inventories;
a graphical listing that corresponds to a node selected in the graphical tree structure;
wherein the graphical user interface further comprises at least one of:
an administrative-side graphical user interface in which the additional graphical tree structure includes all of the user-specific object inventories;
a user-side graphical user interface in which the additional graphical tree structure includes only one or more of the user-specific object inventories that correspond to a specific user of the enterprise software application;
detect a user selection of at least one pre-defined computing object included in the graphical user interface in connection with at least one user-specific object inventory included in the additional graphical tree structure, wherein the user-specific object inventory includes at least one instance of a pre-defined computing object selected from an object-type group;
apply, to the selected pre-defined computing object, a single-membership feature that prevents the selected pre-defined computing object from belonging to multiple object-type groups simultaneously;
populate, in response to the user selection of the pre-defined computing object, the user-specific object inventory included in the additional graphical tree structure with the selected pre-defined computing object such that the selected pre-defined computing object inherits one or more configuration settings from the object-type group during the population of the user-specific object inventory;
detect a user selection of a user-specific object inventory included in the additional graphical tree structure;
modify, in response to the user selection of the user-specific object inventory, the graphical tree structure such that:
a root node of the graphical tree structure corresponds to the selected user-specific object inventory;
the object-type group is displayed in connection with the root node that corresponds to the selected user-specific object inventory;
detect a user selection of the root node of the graphical tree structure that corresponds to the selected user-specific object inventory;
modify, in response to the user selection of the root node of the graphical tree structure, the graphical listing to display at least the pre-defined computing object included in the selected user-specific object inventory.

* * * * *